No. 620,934. Patented Mar. 14, 1899.
T. S. KILGORE.
COUPLING PIN.
(Application filed Dec. 24, 1898.)

(No Model.)

UNITED STATES PATENT OFFICE.

THAD S. KILGORE, OF HENDERSON, IOWA.

COUPLING-PIN.

SPECIFICATION forming part of Letters Patent No. 620,934, dated March 14, 1899.

Application filed December 24, 1898. Serial No. 700,212. (No model.)

*To all whom it may concern:*

Be it known that I, THAD S. KILGORE, a citizen of the United States, and a resident of Henderson, in the county of Mills and State of Iowa, have invented a new and useful Safety Coupling-Pin, of which the following is a specification.

My object is to provide a coupling-pin specially adapted for detachably connecting the overlying end portions of pump-rods that transmit power and motion from a windmill to a pump in such a manner that the pin can be readily locked and unlocked when in position as required for practical use.

My invention consists in providing a coupling-pin with an adjustable locking device, as hereinafter set forth, pointed out in my claims, and illustrated in the accompanying drawings, in which—

Figure 1:
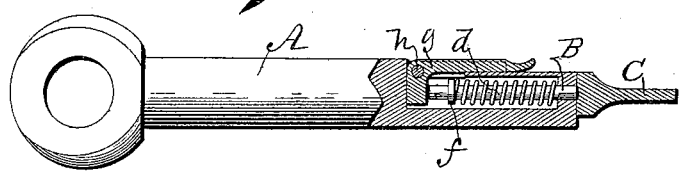
Figure 2:
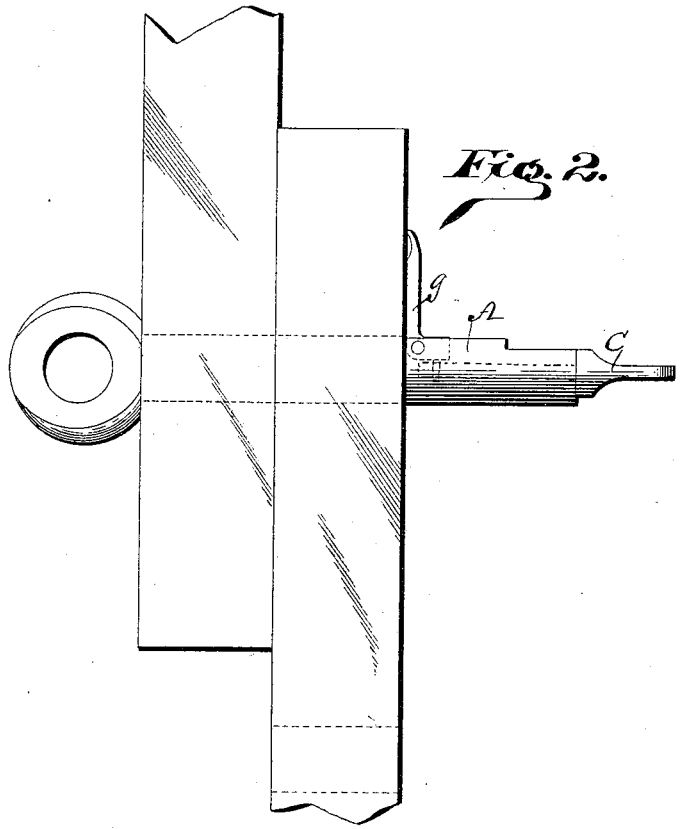

Figure 1 shows the pin, partly in section, and the forms and relative positions of different parts of the operative locking mechanism. Fig. 2 shows the overlying ends of pump-rods securely coupled together by means of my invention and the coupling-pin securely locked in its place.

The letter A designates a metal pin that may vary in size and weight as desired. It has an eye at its head adapting it to be fastened to a cord or chain. A longitudinal central bore in its other end admits a minor spring-actuated pin.

B is a small pin integral with a head C, that is flattened and adapted to be grasped between a person's thumb and finger. A coiled spring $d$ is placed on the pin B, and a collar $f$, fixed on the pin, retains the spring in proper position, so that the pin can be drawn outward and power stored in the spring that when released will return the pin to its normal position in the bore of the coupling-pin A.

The inner end of the bore is intersected by a slot through which the short arm of an elbow-shaped locking-lever $g$ is inserted and secured in place by a fixed pivot $h$ in such a manner that the long arm of the lever can be projected at right angles to the coupling-pin to overlie one of the ends of a coupling-rod, as shown in Fig. 2, and as required to lock the pin to the overlying parts through which it is extended.

The free end of the pin A, over which the lever extends when in its normal position, is flattened, so a person can readily, by means of a finger, engage and lift the long arm of the lever as required to be extended at right angles to the pin A, as shown in Fig. 2.

In the practical use of my invention when the coupling-pin is extended through coinciding bores in overlying parts the end or head of the minor pin B may be seized between the operator's thumb and fingers and pulled outward, so as to allow the long arm of the lever $g$ to be lifted into position, as shown in Fig. 2, and the inner end of the pin B to slip under the short arm of the lever $g$, as required to lock it stationary in the position necessary to prevent any longitudinal movement and escape of the pin A from the overlying parts coupled together therewith.

To unlock the pin A, the minor pin B must again be pulled outward far enough to allow the lever $g$ to be again turned down into its normal parallel position with the pin A, as shown in Fig. 1.

It is obvious my invention can be advantageously used as a linchpin in wagons and for detachably connecting overlying parts in various structures adapted for various purposes.

Having thus described the construction, application, and operation of my invention, its utility is obvious, and what I claim as new, and desire to secure by Letters Patent therefor, is—

1. A coupling-pin having a longitudinal bore in one end and a slot intersecting the inner end of the bore, a minor spring-actuated pin fitted in said bore and an elbow-shaped lever pivoted in said slot, to operate in the manner set forth for the purposes stated.

2. The coupling-pin A having a bore in one end, a minor pin B fitted in said bore and provided with a head at one end and a collar $f$ at the inner end, a coil-spring $d$ on the said minor pin, and an elbow-shaped lever $g$ pivoted in the slot that intersects the bore, all arranged and combined to operate in the manner set forth for the purposes stated.

THAD S. KILGORE.

Witnesses:
GEO. C. BOILEAU,
HENRY MAXWELL.